(12) United States Patent
Yan et al.

(10) Patent No.: US 11,442,418 B2
(45) Date of Patent: Sep. 13, 2022

(54) FIRE TEST SYSTEM AND METHOD FOR TUNNEL STRUCTURE BASED ON REAL-TIME FUSION OF NUMERICAL AND PHYSICAL SPACES

(71) Applicant: TONGJI UNIVERSITY, Shanghai (CN)

(72) Inventors: Zhiguo Yan, Shanghai (CN); Hehua Zhu, Shanghai (CN); Tong Zhang, Shanghai (CN); Wenqi Ding, Shanghai (CN); Yi Shen, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 17/129,836

(22) Filed: Dec. 21, 2020

(65) Prior Publication Data

US 2021/0208554 A1 Jul. 8, 2021

(30) Foreign Application Priority Data

Jan. 2, 2020 (CN) .......................... 202010003414.5

(51) Int. Cl.
*G05B 17/02* (2006.01)
*G01N 25/00* (2006.01)
(Continued)

(52) U.S. Cl.
CPC ............. *G05B 17/02* (2013.01); *G01N 25/00* (2013.01); *A62C 3/0221* (2013.01); *G05B 6/02* (2013.01); *G05B 9/02* (2013.01); *G05B 17/00* (2013.01); *G05B 23/00* (2013.01); *G06N 5/02* (2013.01); *G09B 19/00* (2013.01); *G09B 25/04* (2013.01)

(58) Field of Classification Search
CPC .......... G05B 17/02; G05B 23/00; G05B 9/02; G05B 6/02; G05B 17/00; G01N 25/00; G09B 19/00; G09B 25/04; G06N 5/02; A62C 3/0221
See application file for complete search history.

(56) References Cited

FOREIGN PATENT DOCUMENTS

CN 107563092 A * 1/2018

OTHER PUBLICATIONS

Cucino et al. ("A finite element insight on reinforced concrete tunnels under fire conditions", SWS Engineering S.p.a.—Trento, Enginsoft S.p.a.—Padova, Jul. 2010) (Year: 2010).*

(Continued)

*Primary Examiner* — Daniel R Miller
*Assistant Examiner* — Christian T Bryant (57) ABSTRACT

The present disclosure provides a fire test system and method for tunnel structure based on real-time fusion of numerical and physical spaces. The fire test system includes: a physical test unit, to perform a holographic fire test on the typical segment components of tunnel structure system in a physical space, to obtain holographic characteristic parameter data of the typical components; a numerical analysis unit, to establish a full-scale numerical model of the tunnel-stratum composite system in a numerical space, to obtain multi-field coupling boundary data of the typical components; and a fusion control unit, to control and adjust a multi-field coupling boundary of the physical space according to the multi-field coupling boundary data, and to update and adjust an input parameter of the numerical space according to the holographic characteristic parameter data.

9 Claims, 3 Drawing Sheets

(51) Int. Cl.
*G05B 9/02* (2006.01)
*G09B 25/04* (2006.01)
*G05B 6/02* (2006.01)
*G09B 19/00* (2006.01)
*G06N 5/02* (2006.01)
*G05B 23/00* (2006.01)
*G05B 17/00* (2006.01)
*A62C 3/02* (2006.01)

(56) References Cited

OTHER PUBLICATIONS

Zhang et al. ("Response analysis of tunnel lining structure under impact and fire loading", Advances in Mechanical Engineering. Mar. 2019. doi: 10.1177/1687814019834473) (Year: 2019).*
Beata ("Computational Approaches to Fire-structure Interaction and Real-time Fire Monitoring", University of Michigan, 2017) (Year: 2017).*

* cited by examiner

FIRE TEST SYSTEM AND METHOD FOR TUNNEL STRUCTURE BASED ON REAL-TIME FUSION OF NUMERICAL AND PHYSICAL SPACES

CROSS REFERENCE TO RELATED APPLICATION

This application claims the benefits of priority to Chinese Patent Application No. CN 2020100034145, entitled "Fire Test System and Method for Tunnel Structure Based on Real-Time Fusion of Numerical and Physical Spaces", filed with CNIPA on Jan. 2, 2020, the contents of which are incorporated herein by reference in its entirety.

BACKGROUND

Field of Disclosure

The present disclosure relates to the technical field of tunnels and underground construction engineering, and in particular, to a fire test system and method for tunnel structure based on real-time fusion of numerical and physical spaces.

Description of Related Arts

Fire is the major threat affecting the safety operation of tunnels. Due to the closed space environment, tunnel fires are characterized by fast heating speed, long duration, and uneven temperature distribution, which result in a large quantity of heat being transferred to the tunnel lining structure and surrounding strata during the fire, forming an unsteady temperature field with great temperature difference. Thereby, uneven heat stress and deformation are gradually developed and accumulated in the shield segments, which eventually cause the explosive spalling of the concrete, the debonding of the protective layer, and the thermal degradation of exposed steel bars. The bearing capacity and reliability of the tunnel lining structure are thus significantly reduced.

With the development and progress of society, there are more and more tunnel projects characterized by ultra-long distance, large section, large buried depth, high water and earth pressure, and complex geological conditions. These tunnels have complex lining structures and harsh geological conditions, and the mechanical behavior and failure mechanisms of the tunnels under fire are more complex. Therefore, it is important to ensure the fire safety of the large tunnel structures that are subjected to complex water and earth pressure.

At present, the research methods for the thermo-mechanical coupling problems of large complex tunnel structures at high temperature mainly include solely numerical calculation method, full-scale fire test of shield segment and small-scale fire test of full-ring lining structures. In the traditional research on the thermo-mechanical coupling problem of large complex tunnel structures under complex geological conditions, there are some problems and deficiencies, including: (1) the traditional experimental research and methods cannot take the tunnel structure-stratum as a composite system to consider the fire characteristics; (2) the solely numerical simulation has many limitations, i.e., there are large deviations in the simulation of key issues such as the structure-soil contact, and detail construction of the structure; furthermore, due to the lack of background information and accumulation, the numerical simulation method cannot accurately reflect the real stress and deformation characteristics of the structure; (3) scale model test can hardly reflect the real fire response of the underground structures under complex geological conditions.

Therefore, as the tunnel structure is developing rapidly towards "longer, larger and deeper", the equipment capacity cannot satisfy the growing demand for full-scale tests. There is a huge gap between the available research tools and the needs. Therefore, a new method is needed to solve the above-mentioned problems.

SUMMARY

The present disclosure provides a fire test system and method for tunnel structure based on real-time fusion of numerical and physical spaces. Through the real-time interaction of the numerical and physical spaces and the, the holographic information acquisition of the real high temperature mechanical characteristics of the entire large tunnel structure system (structure and its surrounding stratum environment) and the entire fire process is realized.

The present disclosure provides a fire test system for tunnel structure based on real-time fusion of numerical and physical spaces. The fire test system includes:

a physical test unit, to perform a holographic fire test on a plurality of typical components in a tunnel structure system in a physical space, to obtain holographic characteristic parameter data of the components;

a numerical analysis unit, to establish a full-scale numerical model of the tunnel structure system in a numerical space, to obtain multi-field coupling boundary data of the typical components; and a fusion control unit, to control and adjust a multi-field coupling boundary of the physical space according to the multi-field coupling boundary data, and to update and adjust an input parameter of the numerical space according to the holographic characteristic parameter data.

In an embodiment, the physical test unit includes a fire thermal environment simulation subsystem, a multi-field coupling boundary loading subsystem, and a holographic data acquisition subsystem.

In an embodiment, the fire thermal environment simulation subsystem includes a furnace, a burner, a temperature control box, an air supply device, and a gas supply device.

In an embodiment, the gas supply device includes a liquefied gas cylinder and a gasification apparatus.

In an embodiment, the holographic characteristic parameters include macroscopical mechanical parameters, multi-field characteristic parameters, and multi-scale image information.

In an embodiment, the holographic characteristic parameters include the temperature in the furnace, the temperature distribution inside the segment, the displacement of the segment, the opening angle of the joint, the moisture content of the segment, the ultrasonic wave velocity of the segment, the infrared thermogram of the segment, the crack propagation, and the bursting exfoliation.

In an embodiment, the multi-field coupling boundary data includes the thermal-mechanical-water-vapor multi-field coupling boundary data.

In an embodiment, the full-scale numerical model of the tunnel structure system includes a tunnel structure model and a tunnel-surrounding water and soil model.

In an embodiment, the typical components include a standard block, a capping block, a joint, and a water stop strip.

In an embodiment, the numerical analysis unit obtains the multi-field coupling boundary data of the typical components through lightweight calculation.

In an embodiment, the physical test unit performs a holographic fire test on the plurality of typical components in the tunnel structure system in the physical space, to obtain the time-dependent holographic characteristic parameter data of the components;

the numerical analysis unit establishes a full-scale numerical model of the tunnel structure system in the numerical space, to obtain the time-dependent multi-field coupling boundary data of the typical components;

the fusion control unit controls and adjusts the multi-field coupling boundary of the physical space according to the obtained multi-field coupling boundary data, and updates and adjusts the input parameters of the numerical space in real time according to the obtained holographic characteristic parameter data.

The present disclosure further provides a fire test method for tunnel structure based on real-time fusion of numerical and physical spaces. The fire test method includes:

obtaining the holographic characteristic parameter data of the components by performing a holographic fire test on a plurality of typical components in the tunnel structure system in the physical space;

obtaining the multi-field coupling boundary data of the typical components by establishing a full-scale numerical model of the tunnel structure system in the numerical space; and controlling and adjusting the multi-field coupling boundary of the physical space according to the multi-field coupling boundary data, and updating and adjusting the input parameters in the numerical space according to the holographic characteristic parameter data.

In an embodiment, the holographic characteristic parameters include a macroscopical mechanical parameter, a multi-field characteristic parameter, and image information.

In an embodiment, the holographic characteristic parameters include the temperature in the furnace, the temperature distribution inside the segment, the displacement of the segment, the opening angle of the joint, the moisture content of the segment, the ultrasonic wave velocity of the segment, the infrared thermogram of the segment, the crack propagation, and the bursting exfoliation.

In an embodiment, the operation of obtaining the multi-field coupling boundary data of the typical components by establishing the full-scale numerical model of the tunnel structure system in the numerical space includes: obtaining the multi-field coupling boundary data of the typical components through lightweight calculation by establishing a full-scale numerical model of the tunnel structure system in the numerical space.

In an embodiment, the typical components include a standard block, a capping block, a joint, and a water stop strip.

In an embodiment, the multi-field coupling boundary data includes the thermal-mechanical-water-vapor multi-field coupling boundary data.

In an embodiment, the full-scale numerical model of the tunnel structure system includes a tunnel structure model and a tunnel-surrounding water and soil model.

The fire test system and method of the present disclosure break through the limitations of traditional component test and numerical simulation, creatively integrate the physical space and the numerical space, and can fully reflect the real fire response of the large complex tunnel system under the coupling effect of the fire field.

The fire test system and method for tunnel structure based on real-time fusion of numerical and physical spaces according to the present disclosure can reflect the progressive failure mechanism of the tunnel structure as a discontinuous and hyperstatic system including multiple segments, and can reflect the mechanical characteristics, failure modes, and interaction with the stratum at the level of the structural system.

The fire test system and method for tunnel structure based on real-time fusion of numerical and physical spaces according to the present disclosure can provide theoretical foundation and technical support for solving the fire safety problem of subways and river-crossing and sea-crossing tunnel lining structures in complex environments.

DETAILED DESCRIPTION OF THE PREFERRED EMBODIMENTS

The embodiments of the present disclosure will be described below. Those skilled in the art can easily understand other advantages and effects of the present disclosure according to contents disclosed by the specification. The present disclosure can also be implemented or applied through other different exemplary embodiments. Various modifications or changes can also be made to all details in the specification based on different points of view and applications without departing from the spirit of the present disclosure.

Referring to FIGS. 1-5. It needs to be stated that the drawings provided in the following embodiments are just used for schematically describing the basic concept of the present disclosure. Therefore, those drawings only illustrate components only related to the present disclosure. The drawings are not drawn according to the numbers, shapes and sizes of components during actual implementation. The configuration, number and scale of each component during actual implementation thereof may be freely changed, and the component layout configuration thereof may be more complicated.

The embodiment of the present disclosure provides a fire test method and system for tunnel structure based on real-time data fusion of numerical and physical spaces.

Fire Test System for Tunnel Structure Based on Real-Time Fusion of Numerical and Physical Spaces The fire test system for tunnel structure based on real-time fusion of numerical and physical spaces according to the present disclosure will be described below with reference to FIG. 1.

Figure 1:
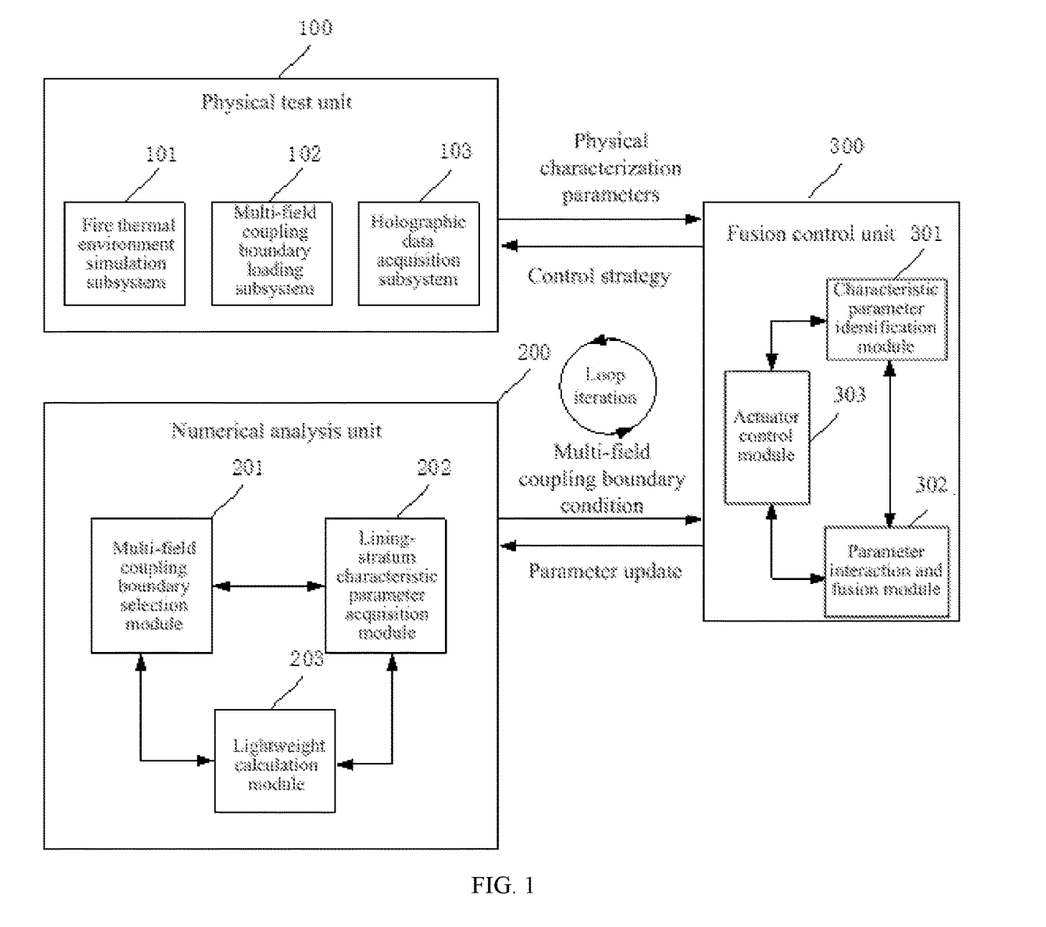
FIG. 1 is a structural block diagram of the fire test system for tunnel structure based on real-time fusion of numerical and physical spaces according to the present disclosure.

As shown in FIG. 1, the fire test system for tunnel structure mainly includes three parts: a physical test unit 100 (physical space), a numerical analysis unit 200 (numerical space), and a fusion control unit 300. Through the fusion of the numerical and physical spaces and the real-time interaction, the holographic information acquisition (multi-scale in space and whole process in time) of the real high temperature mechanical characteristics of the entire large tunnel structure system (including structure and stratum composite system) and the entire fire process (including occurrence, development, spread, and attenuation) is realized. In other words, the tunnel-stratum overall structure is simulated in the numerical analysis unit 200; complex components or weak structures (hereinafter also referred to as typical components or key physical substructures) in the tunnel structure are subjected to separate high temperature physics experiments in the physics test unit 100. Through the interaction and fusion of the real-time data between the numerical and physical objects, the mastery of the real fire response of the large tunnel structure under the real fire boundary can be realized.

Referring to FIG. 1, the physical test unit 100 performs, in the physical space, a holographic fire test on part or all of typical components in the tunnel structure system, to obtain the time-dependent holographic characteristic parameter data of the components. The typical components may be a standard block (such as a segment), a capping block, a joint (such as a bolt joint) or a water stop strip. The holographic characteristic parameters may include a macroscopical mechanical parameter (such as bending moment, axial force or shear force), a multi-field characteristic parameter (such as temperature field or fluid field), and image information (such as crack propagation or bursting exfoliation). The multi-field coupling boundary of the key component (typical component) is obtained from the analysis result of the numerical analysis unit 200. The continuous adjustment of the physical boundary is realized through the control strategy for the complex boundary of the thermal-mechanical-water-vapor multi-field coupling. The time-dependent holographic characteristic parameters of the segment are monitored and fed back while the full-scale segment fire test is carried out.

It should be noted that in physical space, the monitored holographic characteristic parameters mainly include three parts: the first part is related to the "mechanical" in the multi-field coupling, including the displacement of the segment, the opening angle between the joints, which reflect the action of the bending moment, axial force and shear force; the second part is related to "thermal", which mainly refers to the temperature field distribution inside the segment, and the change of the moisture content of the segment (reflecting the migration of water vapor in the segment, i.e., the fluid field); the third part includes image information, which mainly refers to information of crack propagation and bursting exfoliation.

Physical Test Unit 100

Referring to FIG. 1, the physical test unit 100 includes a fire thermal environment simulation subsystem 101, a multi-field coupling boundary loading subsystem 102, and a holographic data acquisition subsystem 103.

As shown in FIG. 1, in this embodiment, the fire thermal environment simulation subsystem 101 simulates the fire thermal environment, which may include, for example, a furnace, a burner, a temperature control box, an air supply device, and a gas supply device. The gas supply device may include a liquefied gas cylinder and a forced gasification apparatus. For example, industrial-grade burners and programs may be used to automatically control the temperature rise. The maximum temperature that the fire thermal environment simulation subsystem 101 can reach is over 1200° C., and the maximum heating rate can be 300° C./min. At the same time, different temperature-time curves may be preset. The fire thermal environment simulation subsystem 101 can better simulate the characteristics of a tunnel fire that has a fast heating speed and a high maximum temperature. At the same time, the generated temperature field has small fluctuations and uniform temperature distribution. The thermal boundary conditions of the fire thermal environment simulation subsystem 101 may adopt standard heating curves, such as ISO834, H-C and RABT curves, as the fire thermal boundary condition of the lining structure.

Referring to FIG. 1, the multi-field coupling boundary loading subsystem 102 may realize the loading of multi-field coupling boundaries including force boundary, temperature boundary, water vapor boundary and surrounding stratum boundary, so as to reflect the internal force of the interaction between the structures, the internal force of the interaction between the structure and the soil, and the relative displacement between the lining segments during the fire simulation process. The components of the multi-field coupling boundary loading subsystem 102 include, but are not limited to, a plurality of horizontal loading actuators and a plurality of vertical loading actuators under the synchronous and asynchronous loading closed-loop control of electro-hydraulic servo actuators. It should be noted that the multi-field coupling boundary loading subsystem 102 may be controlled by the actuator control module 303 of the fusion control unit 300 described below. Load control or displacement control may be selected for the loading actuator respectively. Tests under different working conditions are carried out.

Referring to FIG. 1, the holographic data acquisition subsystem 103 may monitor and feed back the holographic characteristic parameters of typical components, including several test elements and a data acquisition apparatus (such as, a Data Taker). During the test, the holographic characteristic parameters including the temperature in the furnace, the temperature inside the segment, the displacement of the segment, the opening angle of the joint (splaying amount), the moisture content of the segment, the crack propagation and the bursting exfoliation are to be measured. During the test, the data collected by each test element may be transmitted to a computer (containing the fusion control unit 300) through the Data Taker. The test element may be selected according to the to-be-monitored physical quantity. For example, the temperature inside the segment may be measured by inserting a K-type sheathed thermocouple into a thermometer hole reserved in the segment. Since the cold end of the thermocouple is close to the heat source during the test, the temperature of the cold end changes with the fluctuation of the ambient temperature. To minimize the error caused by the temperature change of the cold end and to make the measured temperature closer to the real temperature, the temperature of the cold end of the thermocouple is compensated via a compensation wire method. The temperature in the furnace may be measured by K-type assembled thermocouples, which are arranged in the center and on both sides of the furnace. The displacement of the segment may be measured by arranging a horizontal displacement gauge (or horizontal displacement sensor) and/or a vertical displacement gauge (or vertical displacement sensor). The acquisition of the crack propagation and the bursting exfoliation may be monitored by an image acquisition apparatus.

Figure 4:
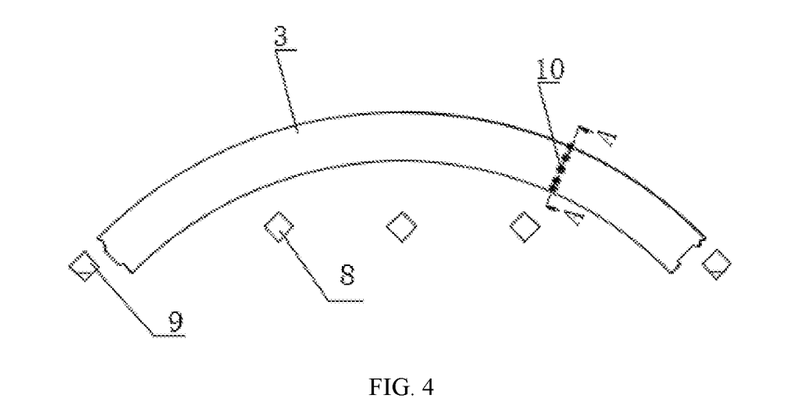
FIG. 4 shows a layout of temperature and displacement measuring points of the lining segment in the physical test unit according to the present disclosure.
Figure 5:
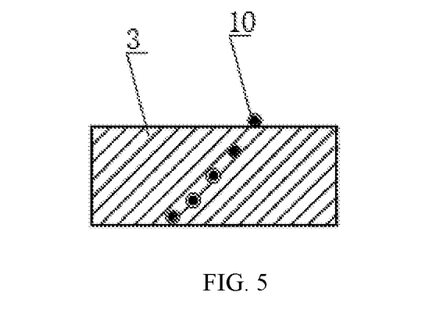
FIG. 5 shows a cross-sectional diagram along the A-A direction in FIG. 4.

As shown in FIGS. 4 and 5, horizontal displacement gauges 9 may be respectively arranged at both ends of the lining segment, and a plurality of vertical displacement gauges 8 may be provided at intervals between the two ends of the lining segment. The displacement data of the lining segment is monitored by the horizontal displacement gauges 9 and the vertical displacement gauges 8. The displacement data is uploaded to the computer through the data acquisition system and processed in the fusion control unit 300. A plurality of thermocouples 10 are arranged in sequence along the thickness direction of the lining segment, to measure the temperature distribution inside the lining segment. As an example, the number of the vertical displacement gauges 8 may be three, and the number of the thermocouples 10 may be five.

Figure 3:
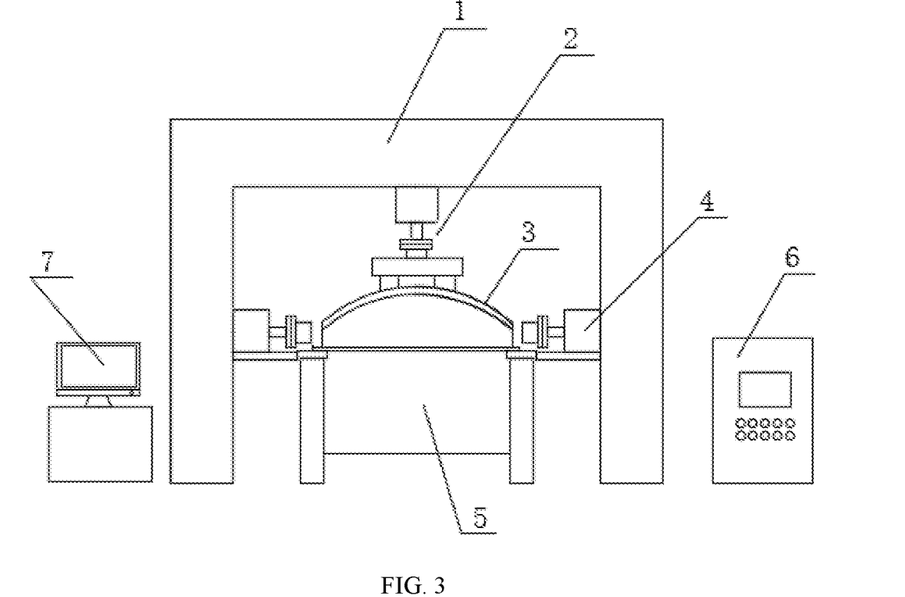
FIG. 3 shows a general layout of the holographic fire test in the physical test unit according to the present disclosure.

As shown in FIG. 3, the general layout of the full-scale fire test includes at least a reactive force frame 1, a vertical actuator 2 (the vertical actuator includes but is not limited to an electro-hydraulic servo vertical jack actuator), a to-be-tested tunnel lining segment 3, a horizontal actuator 4 (the horizontal actuator includes but is not limited to an electro-hydraulic servo horizontal jack actuator), a high-temperature furnace and burner 5 (belonging to the fire thermal environment simulation subsystem 101), an electro-hydraulic servo actuator control box 6, and a control apparatus 7. The to-be-tested tunnel lining segment 3 is disposed on the high-temperature furnace and burner 5, and the fire thermal environment is simulated by the high-temperature furnace and burner 5 and applied to the lining segment 3. The fixed ends of the horizontal actuator 4 and the vertical actuator 2 are connected with the reactive force frame 1, and the movable ends of the horizontal actuator 4 and the vertical actuator 2 are in contact with the to-be-tested tunnel lining segment 3. The horizontal actuators 4 are respectively disposed on both sides of the to-be-tested tunnel lining segment 3, and the vertical actuator 2 is located on the top of the to-be-tested tunnel lining segment 3. The electro-hydraulic servo actuator control box 6 is controlled by the actuator control module 303 of the fusion control unit 300. The horizontal actuator 4 and the vertical actuator 2 are controlled by a control strategy for the complex boundary of the thermal-mechanical-water-vapor multi-field coupling, to realize the application and adjustment of the physical boundary. The control apparatus 7 includes a data acquisition apparatus, the numerical analysis unit 200, and the fusion control unit 300. The data acquisition apparatus is connected with each of the test units. The data collected by each test element may be transmitted to the control apparatus 7 through the Data Taker, and may serve as the holographic characteristic parameter data of the components.

Numerical Analysis Unit 200

Referring to FIG. 1, the numerical analysis unit 200 contains a full-scale numerical model of the tunnel structure system in the numerical space, to obtain the multi-field coupling boundary data of the typical components (i.e., standard block, capping block, joint or water stop strip). Specifically, when a fire occurs, the most dangerous part is the tunnel structure where the fire started, which would lead to the adverse effects of the lining cracking and spalling, and the joint opening. Numerical simulation software is used to simulate the entire ring lining structure under fire. Initial parameters (such as parameters of material constitutive, interaction between structures, thermal-mechanical coupling boundary and water vapor transport) are input. A numerical integration algorithm for solving the differential equation of multi-field coupling tunnel structure is established. The numerical integration algorithm is input into the finite element software to perform lightweight calculations based on characteristic parameters, to obtain the thermal-mechanical response results of the entire structure, that is, to obtain multi-field coupling boundary data. The lightweight calculations are required to realize data fusion interaction with the physical test unit 100 in real time.

It should be noted that the multi-field coupling boundary data solved and output by the full-scale numerical model of the tunnel structure system includes, but not limited to, the temperature distribution inside the segment, the displacement of the segment, the opening angle of the joint (splaying amount), the interaction of internal forces between the segments, the interaction between the structure and the stratum, and distribution of temperature field and internal force in surrounding water and soil.

As shown in FIG. 1, the numerical analysis unit 200 includes a multi-field coupling boundary selection module 201, a lining-stratum characteristic parameter acquisition module 202, and a lightweight calculation module 203. The multi-field coupling boundary selection module 201 may adopt standard heating curves, such as ISO834, H-C and RABT curves, as the fire thermal boundary condition of the lining structure. Besides, the multi-field coupling boundary selection module 201 may use a FDS software solver to calculate the temperature field acting on the lining surface in the fire structure area in combination with the actual conditions such as the location of the fire source, the type and quantity of the combustibles and the heat release rate, as the thermal boundary condition. The lining-stratum characteristic parameter acquisition module 202 may be connected with a parameter interaction and fusion module 302 of the fusion control unit 300. The input parameters of the numerical space are updated and adjusted through the parameter interaction and fusion module 302 (i.e., the data fusion process). The updated and adjusted input parameters may include lining constitutive and formation characteristic parameters, thermal-mechanical-water-vapor multi-field parameters, and the crack propagation and bursting exfoliation parameters. The lightweight calculation module 203 may be used for calculation or establishing a database of numerical simulation results, to simulate a variety of working conditions and realize rapid invocation. For example, a structure-stratum overall model (i.e., full-scale numerical model of the tunnel structure system, which includes a tunnel structure model and a tunnel-surrounding water and soil model) containing surrounding water and soil may be established by means of finite element software or 3D modeling.

As an example, the tunnel structure model may be a refined tunnel lining structure model, which may include detail structures such as water-stops, expansion joints, and caulking strips. The tunnel-surrounding water and soil model may be a water and soil structure model around the lining structure, which involves detailed geological information including stratigraphic structure and groundwater distribution.

For example, the lightweight calculation module 203 may establish a structure-stratum overall model containing surrounding water and soil through ABAQUS software. The concrete segment adopts a CPE4R plane strain element, the steel bar adopts a T2D2 bar element, and the bolt adopts a B21 beam element. The segment joints simulate the contact problem between the segments by setting "surface-surface" contact, the normal model is set to hard contact, and the contact surface friction model is set to "rough" to limit the tangential dislocation on both sides of the joint. The restraint relationship between the steel bar and the segment concrete is "Embedded". The restraint condition between the bolt and the segment concrete is more complicated, which is set as "Embedded" restraint, and the contact surface and relevant parameters are adjusted according to the actual situation. The functions of the lightweight calculation module 203 may be implemented in other ways.

It should be noted that in this embodiment, the simulation of tunnel joints follows the following assumptions: the segments on both sides are considered to be homogeneous concrete materials, and there is no shear force on the joint; the volume of the bolt in the joint is small, therefore, the weakening of the segment structure by the bolt holes in the segment is not considered, the volume effect of the bolt is not considered, and the bolt is considered to be a line element connector with certain stiffness; in the joint area, the effects of concrete creep and lining concrete burst are not considered.

It should be noted that the structure-stratum overall model containing surrounding water and soil established by the lightweight calculation module 203 needs to have lightweight calculation characteristics, that is, the thermal-mechanical response results of the required model needs to be output in a short time, so as to realize the interaction and fusion of the real-time data between the numerical and physical objects.

Fusion Control Unit 300

Referring to FIG. 1, the fusion control unit 300 controls and adjusts the multi-field coupling boundary of the physical space according to the multi-field coupling boundary data, and updates and adjusts the input parameters of the numerical space according to the holographic characteristic parameter data at the same time.

In this embodiment, the fusion control unit 300 realizes the interaction and fusion of the real-time data between the numerical and physical objects by establishing a parameter identification and update method for solving multi-field thermal-mechanical coupling problems. In the process of fusion control, numerical test and physical test are carried out at the same time. Through the establishment of the fusion control unit 300 for the multi-field coupling problem of "thermal-mechanical-water-vapor", real-time acquisition and recording of data from two spaces are carried out. Characteristic parameter identification and consistency judgment are performed to realize the data interaction and iterative calculation of the two systems. The thermal-mechanical-water-vapor coupling boundaries of the physical space are controlled and adjusted according to the simulation results of the numerical space. According to the measured data of the physical space, the input parameters (including the lining constitutive and formation characteristic parameters, multi-field parameters, and the crack propagation and bursting exfoliation parameters) in the numerical simulation process are continuously updated and adjusted by resetting the accuracy conditions. The above operations are repeated until the end of the test. That is to say, the fusion control unit 300 of this embodiment needs to have the following functions: characteristic parameter identification, parameter consistency and sensitivity judgment, data fusion and model updating and loop iterative calculation suitable for solving the multi-field coupling problem of "thermal-mechanical-water-vapor". The fusion control unit 300 may output the updated multi-field boundary loading control strategy for the physical space in real time. The fusion control unit 300 may output the updated material constitutive characteristic parameters, formation characteristic parameters, and the crack propagation and bursting exfoliation parameters for the numerical space in real time; the updated parameters may serve as input parameters for redoing the numerical calculations.

In the numerical space, since the constitutive parameters of the initial calculation model are often obtained based on experience, the calculation results have large errors compared with the actual situation. In addition, in the fire, the situations of crack propagation and bursting exfoliation may occur on the lining constitutive. For better accuracy of the numerical simulation, the fusion control unit 300 may update and adjust the lining constitutive characteristic parameters in the numerical space according to the holographic characteristic parameter data obtained by the physical test unit, and may at the same time update and adjust the crack propagation and bursting exfoliation parameters. Specifically, based on the monitored holographic characteristic parameters in the physical space, the lining constitutive and formation characteristic parameters may be deduced, and may serve as input parameters for redoing the numerical calculations. The constitutive characteristic parameters of the lining may include mechanical indexes such as the elastic modulus and strength of the lining concrete, and thermal indexes such as the thermal conductivity and specific heat parameters. The formation characteristic parameters may include the internal friction angle, shear strength and thermal conductivity of the water and soil around the underground structure. For example, characteristic parameters such as specific heat capacity, thermal conductivity and thermal expansion coefficient may be directly measured in physical tests. The constitutive parameters such as elastic modulus may be calculated indirectly through stress-strain curves.

In the physical space, to truly reflect the internal forces of the interaction between structures, the internal forces of the interaction between the structure and the soil, and the relative displacement between lining segments, the fusion control unit 300 may identify and calculate the thermal-mechanical-water-vapor multi-field coupling boundary conditions by combining the multi-field coupling boundary data and component interaction parameter data of the typical components acquired in the numerical space. The parameter interaction and fusion module 302 may control the actuator control module 303 to operate. The actuator control module 303 controls and adjusts the multi-field coupling boundary of the physical space through the multi-field coupling boundary loading subsystem. That is, the actuator control module 303 corrects the multi-field action applied on the physical model boundary, including the magnitude of external force and thermal boundary.

As shown in FIG. 1, the fusion control unit 300 includes a characteristic parameter identification module 301, a parameter interaction and fusion module 302, and an actuator control module 303. The characteristic parameter identification module 301 is respectively connected with the output terminals of the holographic data acquisition subsystem 103 and the numerical analysis unit 200, to perform parameter identification on the received data. The parameter interaction and fusion module 302 is connected with the characteristic parameter identification module 301. The parameter interaction and fusion module 302 uses the characteristic parameter identification module 301 to control the operation of the actuator control module 303 according to the characteristic parameters identified by the multi-field coupling boundary data and component interaction parameter data. The actuator control module 303 controls and adjusts the multi-field coupling boundary of the physical space through the multi-field coupling boundary loading subsystem 102. The parameter interaction and fusion module 302 also uses the characteristic parameter identification module 301 to update and adjust the input parameters in the numerical space according to the characteristic parameters identified by the holographic characteristic parameter data.

The fusion control unit 300 needs to perform the fusion of the sensitivity of characteristic parameters, the on-line identification method and the iterative calculation method, to establish the variation rule and calculation model of key mechanical parameters such as elastic modulus and strength of the full-scale (large-scale) lining structure under thermal-mechanical-water-vapor multi-field coupling boundary conditions, so as to eventually form a thermal-water-vapor-mechanical multi-field coupling calculation model for the soft clay surrounding the tunnel under fire and high temperature, and a lightweight calculation method for the simplified numerical model.

It should be noted that in this embodiment, the fusion control unit 300 may be programmed in a C language or Python language environment. The fusion control unit 300 may perform joint computation with the help of multiple desktop computers or workstations, and may provide corresponding external interfaces to operate in conjunction with external computing platforms such as supercomputer centers to improve data processing capabilities.

It should be noted that pure physical model tests generally only load external force and heat on the structure, and cannot reflect the interaction between the structures and the interaction between the structure and the soil. In other words, the "thermal-mechanical-water-vapor multi-field boundary condition" in pure physical model tests is ambiguous. In pure numerical simulations, since the constitutive parameters of the initial calculation model are often obtained only based on experience, the calculation results have large errors compared with the actual situation. While in this embodiment, the "fusion" process combines the advantages of the two methods and makes up for the shortcomings of the two methods. The fusion process is mainly about the judgment and interaction of parameters.

Fire Test Method for Tunnel Structure Based on Real-Time Data Fusion of Numerical and Physical Spaces The fire test method for tunnel structure based on real-time data fusion of numerical and physical spaces according to the present disclosure will be described below with reference to FIG. 2. The fire test method includes: S10, a thermal boundary condition is selected; S20, in the physical space, a holographic fire test is performed on a plurality of typical components (i.e., key physical substructure 1, key physical substructure N in FIG. 2) in the tunnel structure system, to obtain the holographic characteristic parameter data of the components; S30, in the numerical space, a full-scale numerical model of the tunnel structure system is established, to obtain the multi-field coupling boundary data of the typical components; S40, the multi-field coupling boundary of the physical space is controlled and adjusted according to the multi-field coupling boundary data, and the input parameters in the numerical space are updated and adjusted according to the holographic characteristic parameter data.

In operation S10, when conducting the fire test of the tunnel structure, the thermal boundary condition should be selected first. For example, the H-C or/and RABT curves may be selected as the fire thermal boundary condition of the lining structure. The H-C and RABT standard fire heating curves represent two typical fire conditions with long-lasting high temperature and with extinguishing and cooling stages, respectively.

The operation S20 includes: S21, part or all of the typical components (including standard block, capping block, joint or water stop strip) in the tunnel structure system are selected, and the fire thermal environment of each typical component is simulated through the fire thermal environment simulation subsystem 101; S22, the typical components are loaded with multi-field coupling boundary conditions through the multi-field coupling boundary loading subsystem 102; S23, the multi-field coupling boundary is controlled and adjusted in real time by a preset boundary control method (boundary control strategy); and S24, the holographic characteristic parameter data of the typical components (lining) are monitored and fed back in real time through the holographic data acquisition subsystem 103.

In operation S22, the typical components are loaded with multi-field coupling boundary conditions through the multi-field coupling boundary loading subsystem 102, to reflect the internal forces of the interaction between structures, the internal forces of the interaction between the structure and the soil, and the relative displacement between lining segments during the fire simulation process.

In operation S23, the internal forces of the interaction between structures, the internal forces of the interaction between the structure and the soil, and the relative displacement between lining segments cannot be known in advance. Therefore, they need to be obtained through numerical simulation calculation. The multi-field coupling boundary loading subsystem 102 needs to control and adjust the thermal coupling boundary of the physical space in real time according to the simulation result of the numerical space. Specifically, the fusion control unit 300 controls the multi-field coupling boundary loading subsystem 102 to load the multi-field coupling boundary conditions according to the multi-field coupling boundary data of the typical components obtained in operation S30 (see operation S42 below). The detailed control process is described in the relevant part above, and will not be repeated here.

In operation S24, the holographic characteristic parameters include the data of temperature in the furnace, the temperature distribution inside the segment, the displacement of the segment, the opening angle of the joint, the moisture content of the segment, the ultrasonic wave velocity of the segment, the infrared thermogram of the segment, the crack propagation, and the bursting exfoliation.

The operation S30 includes: S31, the thermal boundary condition of the numerical model is calculated; S32, the lining constitutive and formation characteristic parameters are input; S33, the full-scale numerical model of the tunnel structure system (the full-scale numerical model of the tunnel structure system includes a tunnel structure model and a tunnel-surrounding water and soil model) is established based on the input lining constitutive and formation characteristic parameters; S34, lightweight calculations are performed based on the characteristic parameters; and S35, the multi-field coupling boundary conditions (including thermal-mechanical-water-vapor multi-field coupling boundary conditions) are output.

In operation S31, based on the thermal boundary conditions selected in operation S10, combining with the actual conditions such as the location of the fire source, the type and quantity of the combustibles and the heat release rate, the temperature field acting on the lining surface in the fire structure area is calculated by a FDS software solver, and serves as a thermal boundary condition of the numerical model.

In operation S32, in the numerical space, since the constitutive parameters of the initial calculation model are often obtained only based on experience, the calculation results have large errors compared with the actual situation. In addition, in the fire, the situations of crack propagation and bursting exfoliation may occur on the lining constitutive. For better accuracy of the numerical simulation, it is necessary to identify and calculate the lining constitutive and formation characteristic parameters, the crack propagation and bursting exfoliation parameters based on the measurement data of the physical space, and the parameters may serve as input parameters for redoing the numerical calculations. Specifically, the fusion control unit 300 may update and adjust the lining constitutive characteristic parameters, the formation characteristic parameters, the crack propagation and bursting exfoliation parameters in the numerical space according to the holographic characteristic parameter data obtained in operation S20 (see operation S42 below), so as to update and adjust the full-scale numerical model of the tunnel structure system established in operation S33. The detailed control process is described in the relevant part above, and will not be repeated here.

In operations S33-S35, a numerical integration algorithm for solving the differential equation of multi-field coupling tunnel structure is established based on the input parameters (the lining constitutive characteristic parameters, the formation characteristic parameters, the crack propagation and bursting exfoliation parameters). The numerical integration algorithm is input into the finite element software to perform lightweight calculations based on characteristic parameters (corresponding to operation S34), to obtain the thermal-mechanical response results of the entire structure (corresponding to operation S35), that is, to obtain multi-field coupling boundary data.

Figure 2:
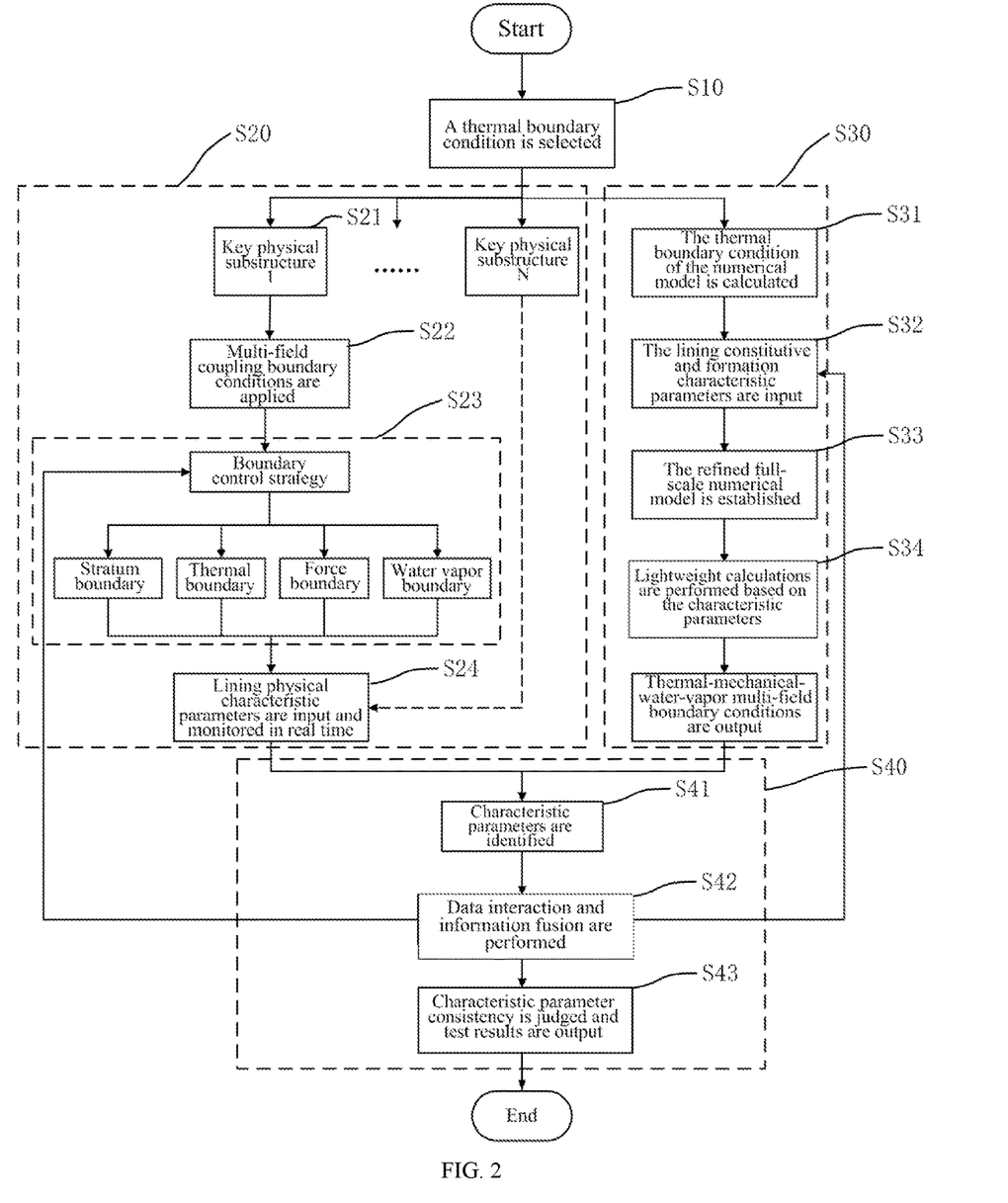
FIG. 2 is a schematic flowchart of the fire test method for tunnel structure based on real-time fusion of numerical and physical spaces according to the present disclosure.

As shown in FIG. 2, the operation S40 includes: S41, characteristic parameters are identified; S42, data interaction and information fusion are performed based on the characteristic parameters identified in operation S41; and S43, characteristic parameter consistency is judged and test results are output.

In operation S41, for the physical space, the identification of characteristic parameters is equivalent to the identification of the thermal-mechanical-water-vapor multi-field coupling boundary conditions. For the numerical space, the identification of characteristic parameters is equivalent to the identification of the lining constitutive characteristic parameters, the formation characteristic parameters, the crack propagation and bursting exfoliation parameters.

In operation S42, the fusion control unit 300 controls the multi-field coupling boundary loading subsystem 102 to load the multi-field coupling boundary conditions in real time according to the thermal-mechanical-water-vapor multi-field coupling boundary conditions identified in operation S41. The fusion control unit 300 updates and adjusts the input parameters in the numerical space in real time according to the lining constitutive and formation characteristic parameters identified in operation S41.

In operation S43, when the test is ended, the output results of physical test and numerical simulation test are combined to reflect the real response of the structural system in the fire. Specifically, the real response of the structural system during the fire includes physical characterization parameters in the physical space and data in the numerical space. The physical characterization parameters in the physical space include: the temperature in the furnace, the temperature distribution inside the segment, the displacement of the segment, the opening angle of the joint (splaying amount), the moisture content of the segment, the ultrasonic wave velocity of the segment and the infrared thermogram of the segment. The data in the numerical space include: the overall temperature distribution of the structural system, the displacement of the segment, the internal forces of the interaction between the segments, the interaction between the structure and the stratum, and distribution of temperature field and internal force in the surrounding water and soil.

It should be noted that the present disclosure starts from the thermal-mechanical coupling behavior of the tunnel lining segments, and deeply understands the failure mechanism and mode of the entire ring structure of a shield tunnel under the action of the changes in the water and soil pressure and elastic resistance of the surrounding ground under the fire. A calculation method for the entire ring structure of the shield tunnel under fire is established. A quantitative safety evaluation method for tunnel lining based on formation-structure method under fire and high temperature is established.

The fire test system and method for tunnel structure based on real-time fusion of numerical and physical spaces according to the present disclosure break through the limitations of traditional component test and numerical simulation, creatively integrate the physical space and the numerical space, and can fully reflect the real fire response of the large complex tunnel system under the coupling effect of the fire field. The fire test system and method for tunnel structure based on real-time fusion of numerical and physical spaces according to the present disclosure can reflect the progressive failure mechanism of the tunnel structure as a discontinuous and hyperstatic system composed of multiple segments, and can reflect the mechanical characteristics, failure modes and interaction with the ground at the level of the structural system. The fire test system and method for tunnel structure based on real-time fusion of numerical and physical spaces according to the present disclosure can provide theoretical foundation and technical support for solving the fire safety problem of subways and river-crossing and sea-crossing tunnel lining structures in complex environments.

In the description herein, numerous specific details are provided, such as examples of components and/or methods, to provide a thorough understanding of embodiments of the present disclosure. Those skilled in the art will recognize, however, that the embodiments of the present disclosure may be practiced without one or more of the specific details, or with other devices, systems, components, methods, materials, parts, and so forth. In other instances, well-known structures, materials, and/or operations are not shown or described in detail to avoid obscuring aspects of various embodiments of the present disclosure.

It should also be understood that one or more of the elements shown in the drawings may be implemented in a more separate or integrated manner, or even be removed for being unable to be operated in some cases, or be provided for being useful for a specific application.

Furthermore, unless otherwise indicated, the term "or" as used herein generally means "and/or". In cases where the term is foreseen because it is unclear to provide separation or combination capabilities, the combination of components or operations will also be deemed to have been specified.

As used in the description herein and throughout the claims, unless otherwise stated, "a", "an" and "the" include plural references. Likewise, as used in the description herein and throughout the claims, unless otherwise stated, the meaning of "in" includes "in" and "on".

The above description of illustrated embodiments of the present disclosure, including what is described in the Abstract, is not intended to be exhaustive or to limit the present disclosure to the precise forms disclosed herein. Although specific embodiments and examples of the present disclosure are described herein for illustrative purposes only, various equivalent modifications are possible within the spirit and scope of the present disclosure, as those skilled in the art will recognize and understand. As indicated, these modifications may be made to the present disclosure according to the above description of the embodiments of the present disclosure, and these modifications will be within the spirit and scope of the present disclosure.

What is claimed is:

1. A fire test system for tunnel structure based n real-time fusion of numerical and physical spaces, comprising:
   a physical test unit, to perform a holographic fire test on a plurality of components of a tunnel structure system in a physical space, to obtain holographic characteristic parameter data of the components, wherein the physical test unit includes a fire thermal environment simulation subsystem, a multi field coupling boundary loading subsystem, and a holographic data acquisition subsystem, wherein the fire thermal environment simulation subsystem comprises a furnace, a burner, a temperature control box, an air supply device, and a gas supply device, wherein the gas supply device include a liquefied gas cylinder and a forced gasification apparatus;
   a numerical analysis unit, to establish a full-scale numerical mode of a tunnel-stratum system in a numerical space, to obtain multi-field coupling boundary data of the components; and
   a fusion control unit, to control and adjust a multi-field coupling boundary of the physical space according to the multi-field coupling boundary data, and to update and adjust an input parameter of the numerical space according to the holographic characteristic parameter data.

2. The fire test system for tunnel structure based on real-time fusion of numerical and physical spaces according to claim 1, wherein the numerical analysis unit obtains the multi-field coupling boundary data of the components through lightweight calculation.

3. The fire test system for tunnel structure based on real-time fusion of numerical and physical spaces according to claim 1, wherein the holographic characteristic parameter includes a macroscopical mechanical parameter, a multi-field characteristic parameter, and multi-scale image information.

4. The fire test system for tunnel structure based on real-time fusion of numerical and physical spaces according to claim 1, wherein the components include a standard block, a capping block, a joint, and a water stop strip.

5. The fire test system for tunnel structure based on real-time fusion of numerical and physical spaces according to claim 1, wherein the full-scale numerical model of the tunnel structure system includes a tunnel structure model and a tunnel-surrounding water and soil model.

6. A fire test method for tunnel structure based on real-time fusion of numerical and physical spaces, comprising:
   obtaining holographic characteristic parameter data of a component by performing a holographic fire test on a plurality of components in a tunnel structure system in a physical space by a physical test unit, wherein the physical test unit includes a fire thermal environment simulation subsystem, a multi-field coupling boundary loading subsystem, and a holographic data acquisition subsystem, wherein the fire thermal environment simulation subsystem comprises a furnace, a burner, a temperature control box, an air supply device, and a gas supply device, wherein the gas supply device include a liquefied gas cylinder and a forced gasification apparatus;
   obtaining multi-field coupling boundary data of the component by establishing a full-scale tunnel-stratum numerical model of the tunnel structure system in a numerical space;
   controlling and adjusting the multi-field coupling boundary of the physical space according to the multi-field coupling boundary data, and updating and adjusting an input parameter in the numerical space according to the holographic characteristic parameter data.

7. The fire test method for tunnel structure based on real-time fusion of numerical and physical spaces according to claim 6, wherein the holographic characteristic parameter includes a macroscopical mechanical parameter, a multi-field characteristic parameter, and image information.

8. The fire test method for tunnel structure based on real-time fusion of numerical and physical spaces according to claim 6, wherein the obtaining of the multi-field coupling boundary data of the component by establishing the full-scale numerical model of the tunnel structure system in the numerical space includes: obtaining the multi-field coupling boundary data of the components through lightweight calculation by establishing the full-scale numerical model of the tunnel structure system in the numerical space.

9. The fire test method for tunnel structure based on real-time fusion of numerical and physical spaces according to claim 6, wherein the full-scale numerical model of the tunnel structure system includes a tunnel structure model and a tunnel-surrounding water and soil model.

* * * * *